US010979627B2

(12) United States Patent
Yun et al.

(10) Patent No.: US 10,979,627 B2
(45) Date of Patent: Apr. 13, 2021

(54) MOBILE TERMINAL

(71) Applicant: LG ELECTRONICS INC., Seoul (KR)

(72) Inventors: Jiwon Yun, Seoul (KR); Eunyoung Noh, Seoul (KR); Seungmin Yang, Seoul (KR); Junhwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/578,216

(22) Filed: Sep. 20, 2019

(65) Prior Publication Data

US 2020/0099856 A1  Mar. 26, 2020

(30) Foreign Application Priority Data

Sep. 21, 2018 (WO) ................ PCT/KR2018/011338

(51) Int. Cl.
*H04N 5/232* (2006.01)
*H04N 5/247* (2006.01)
(Continued)

(52) U.S. Cl.
CPC ....... *H04N 5/23227* (2018.08); *G11B 27/031* (2013.01); *H04N 5/23293* (2013.01); *H04N 5/247* (2013.01); *H04N 5/2621* (2013.01)

(58) Field of Classification Search
CPC ............. G11B 27/031; H04N 5/23227; H04N 5/23293; H04N 5/247; H04N 5/2621; H04N 5/2624; H04N 5/2625; H04N 5/2628

(Continued)

(56) References Cited

U.S. PATENT DOCUMENTS 10,154,186 B2 * 12/2018 Kang ................... H04N 5/2259
2006/0175549 A1   8/2006 Miller et al.
(Continued)

FOREIGN PATENT DOCUMENTS

CN     106454132    2/2017
JP     2006340108   12/2006
(Continued)

OTHER PUBLICATIONS

PCT International Application No. PCT/KR2018/011338, Notification of Transmittal of the International Search Report and the Written Opinion of the International Searching Authority, or Declaration dated Jun. 19, 2019, 10 pages.

*Primary Examiner* — Thai Q Tran
*Assistant Examiner* — Stephen R Smith
(74) *Attorney, Agent, or Firm* — Lee, Hong, Degerman, Kang & Waimey

(57) ABSTRACT

Proposed is a mobile terminal including triple cameras having first, second and third FOVs (field of views) respectively, wherein the first FOV is larger than the second FOV which is larger than the third FOV, wherein the mobile terminal includes: a display for outputting visual information; and a controller configured for controlling the triple cameras and the display, wherein the controller is configured for: detecting a signal to indicate capturing an object by the triple cameras at a time; in response to the detected signal, activating cameras of the first FOV and second FOV to capture the object individually; deactivating one of the cameras of the first FOV and second FOV, wherein one of the cameras of the first FOV and second FOV has captured the object earlier than the other thereof; and activating a camera of the third FOV to capture the object using an imaging setting values obtained from at least one of the cameras of the first FOV and second FOV.

17 Claims, 17 Drawing Sheets

(51) Int. Cl.
*G11B 27/031* (2006.01)
*H04N 5/262* (2006.01)

(58) Field of Classification Search
USPC ............... 386/224; 348/46, 47, 159; 396/72
See application file for complete search history.

(56) References Cited

U.S. PATENT DOCUMENTS

| | | | | |
|---|---|---|---|---|
| 2007/0025714 | A1* | 2/2007 | Shiraki | H04N 9/045 |
| | | | | 396/72 |
| 2014/0132735 | A1* | 5/2014 | Lee | H04N 5/23238 |
| | | | | 348/47 |
| 2016/0205380 | A1* | 7/2016 | Inoue | H04N 13/239 |
| | | | | 348/46 |
| 2016/0316147 | A1* | 10/2016 | Bernstein | H04N 5/247 |
| 2017/0085764 | A1* | 3/2017 | Kim | H04N 5/23296 |
| 2018/0070009 | A1* | 3/2018 | Baek | H04N 5/2353 |
| 2018/0070023 | A1* | 3/2018 | Oh | H04N 13/239 |
| 2019/0007589 | A1* | 1/2019 | Kadambala | H04N 5/23241 |
| 2019/0020823 | A1* | 1/2019 | Jeon | H04N 5/23216 |
| 2019/0082101 | A1* | 3/2019 | Baldwin | H04N 5/2258 |
| 2019/0236765 | A1* | 8/2019 | Yeo | H04N 5/23229 |
| 2020/0092486 | A1* | 3/2020 | Guo | H04N 5/23296 |
| 2020/0204746 | A1* | 6/2020 | Kang | H04N 5/23296 |
| 2020/0244871 | A1* | 7/2020 | Srivastava | H04N 5/23293 |

FOREIGN PATENT DOCUMENTS

| | | | | |
|---|---|---|---|---|
| KR | 20170006559 | A * | 1/2017 | ....... H04N 5/232933 |
| KR | 1020170006559 | | 1/2017 | |
| KR | 1020170029330 | | 3/2017 | |

* cited by examiner

[FIG. 1A]
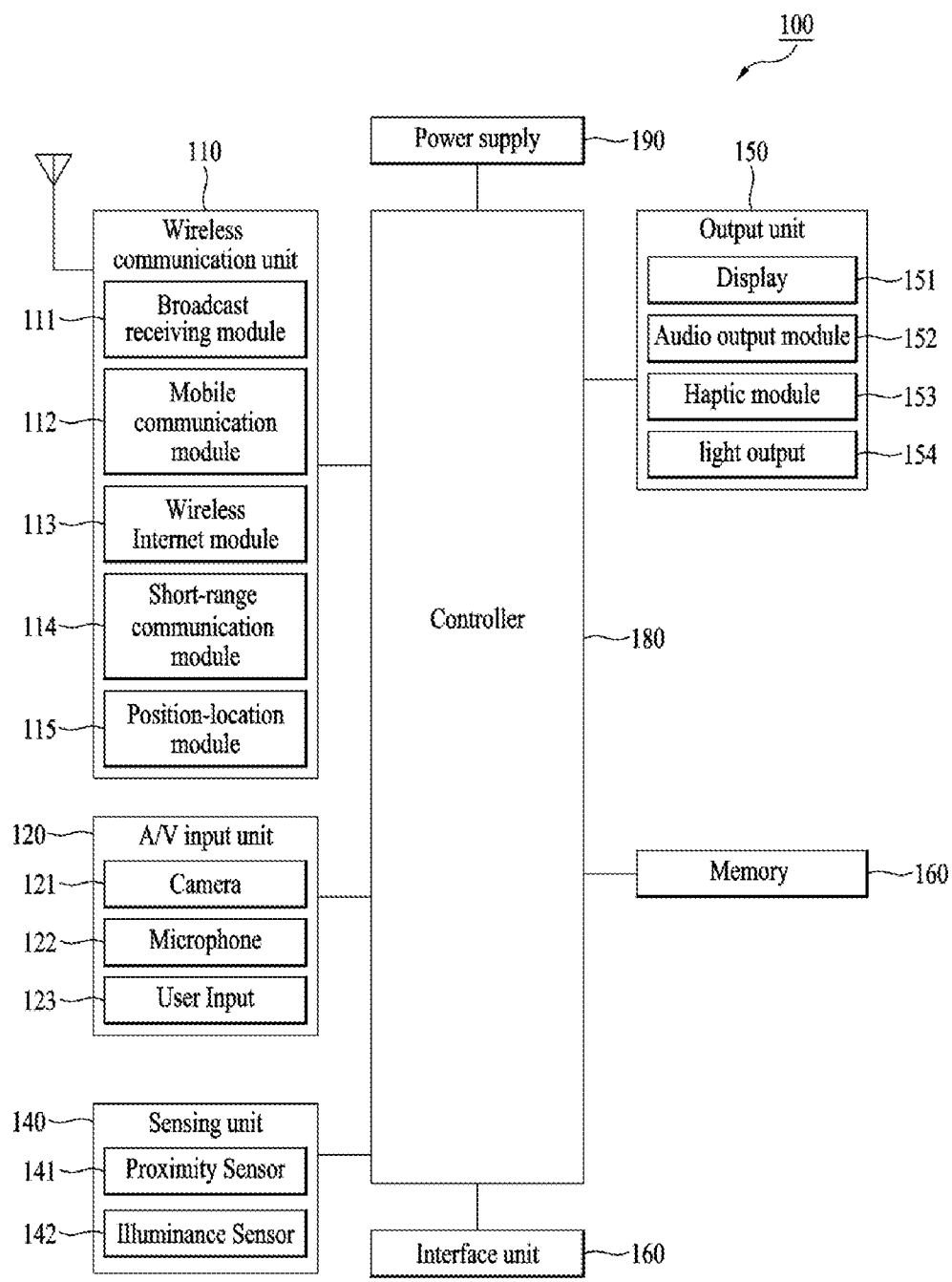

[FIG. 1B]
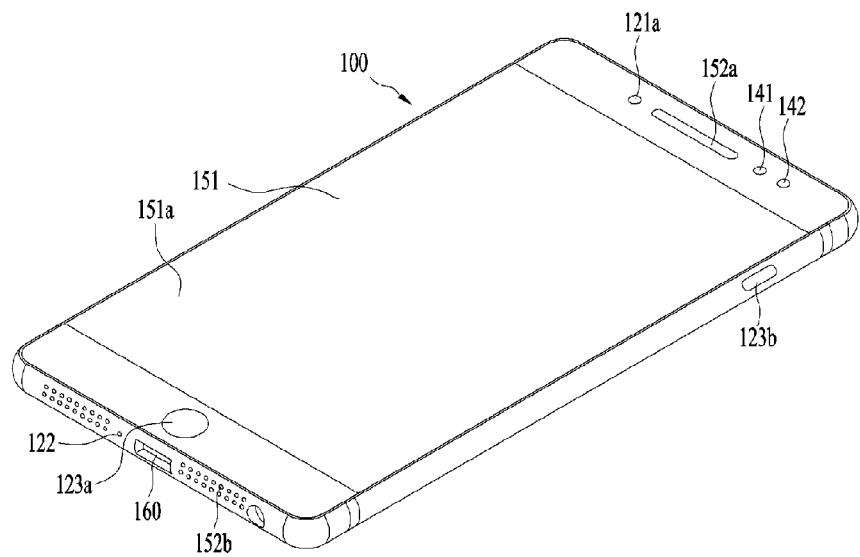

[FIG. 1C]
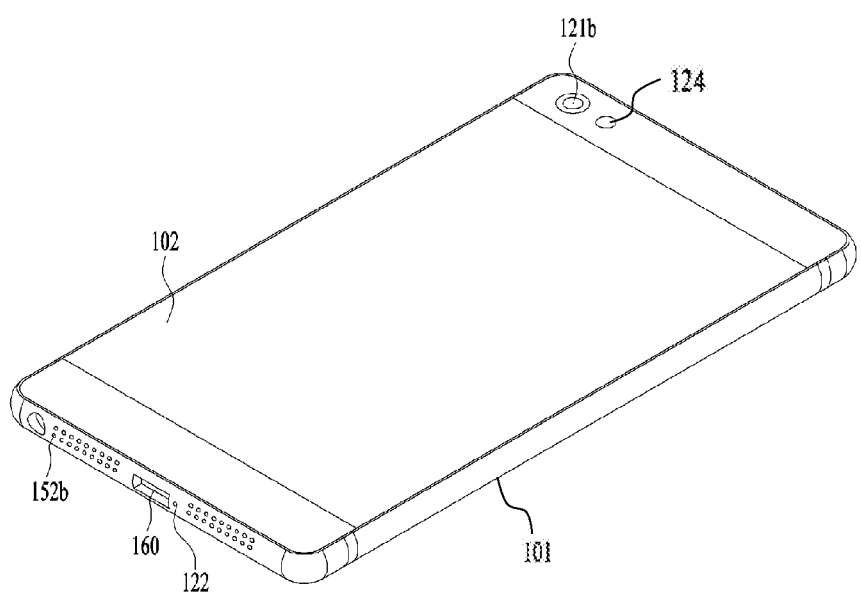

[FIG. 2]
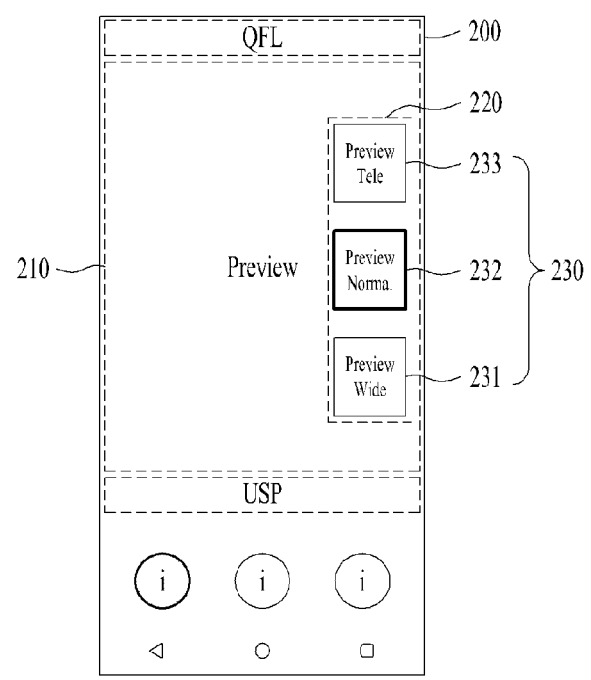

[FIG. 3]
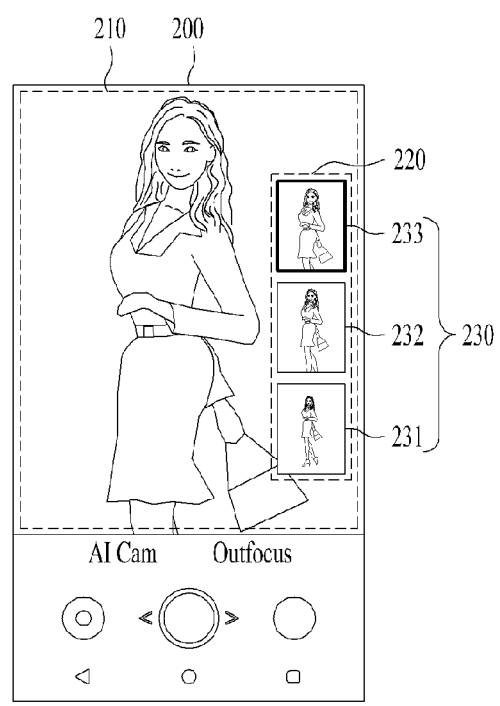

[FIG.4]

| View Angle of Preview window | Wide angle camera | Regular angle camera | Telephoto angle camera |
|---|---|---|---|
| Wide angle | O | X | X |
| Regular angle | O | O | X |
| Telephoto angle | O | X | O |

[FIG.5]
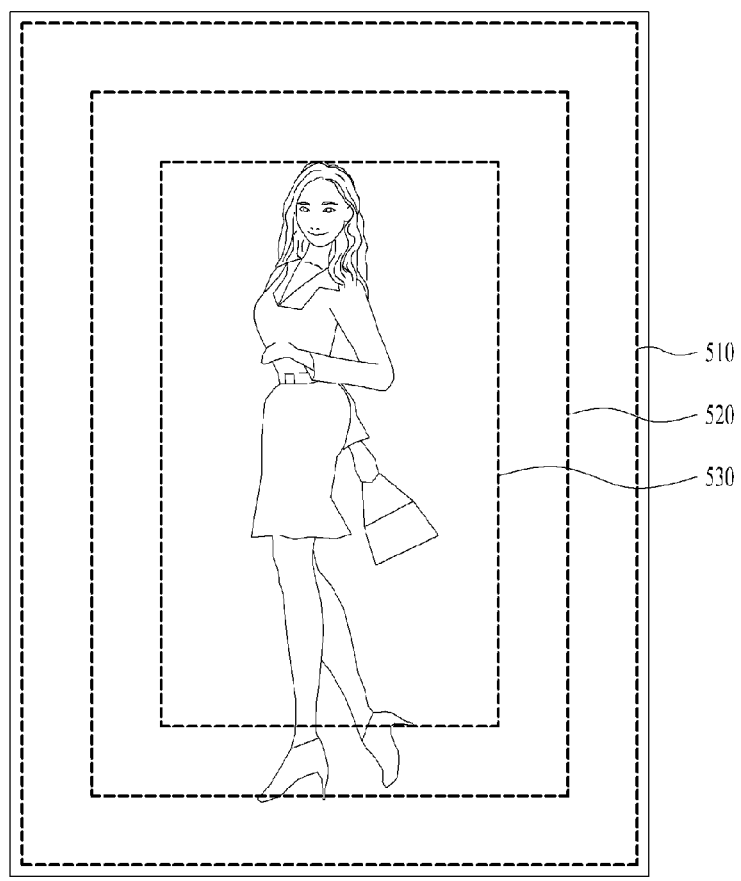

[FIG.6]
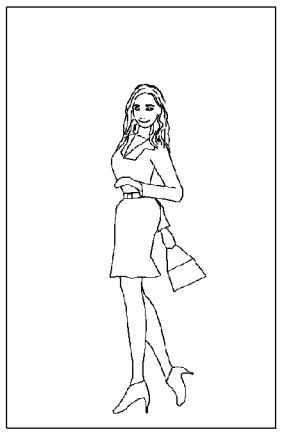
(a)
(b)
(c)

[FIG.7]
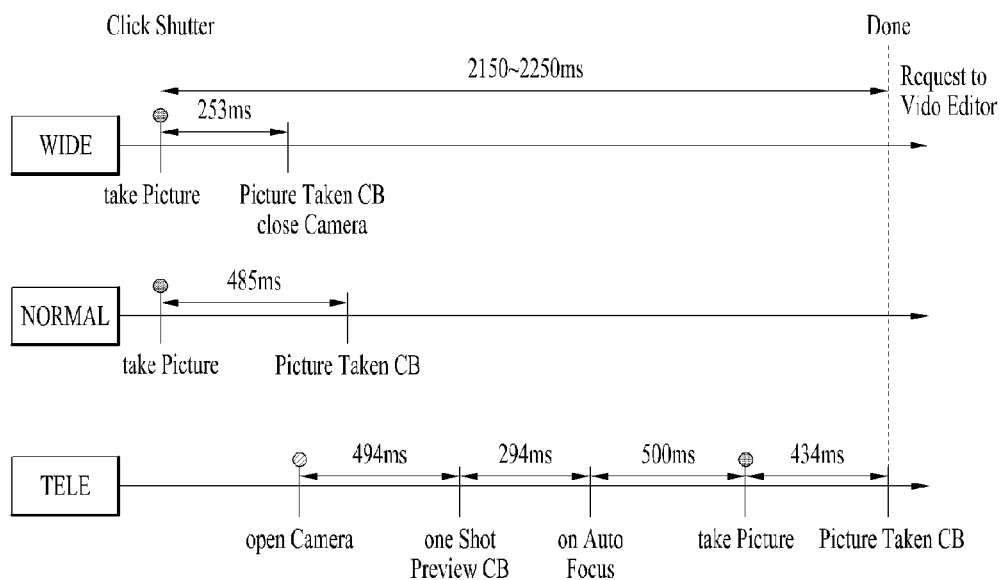

[FIG.8]
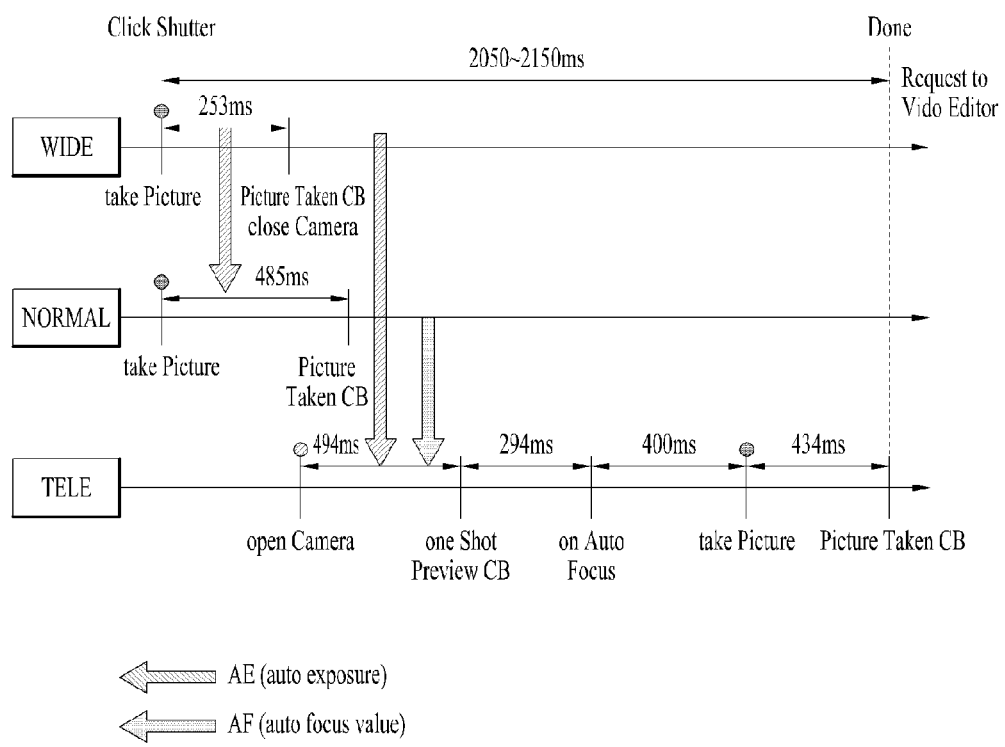

[FIG.9]
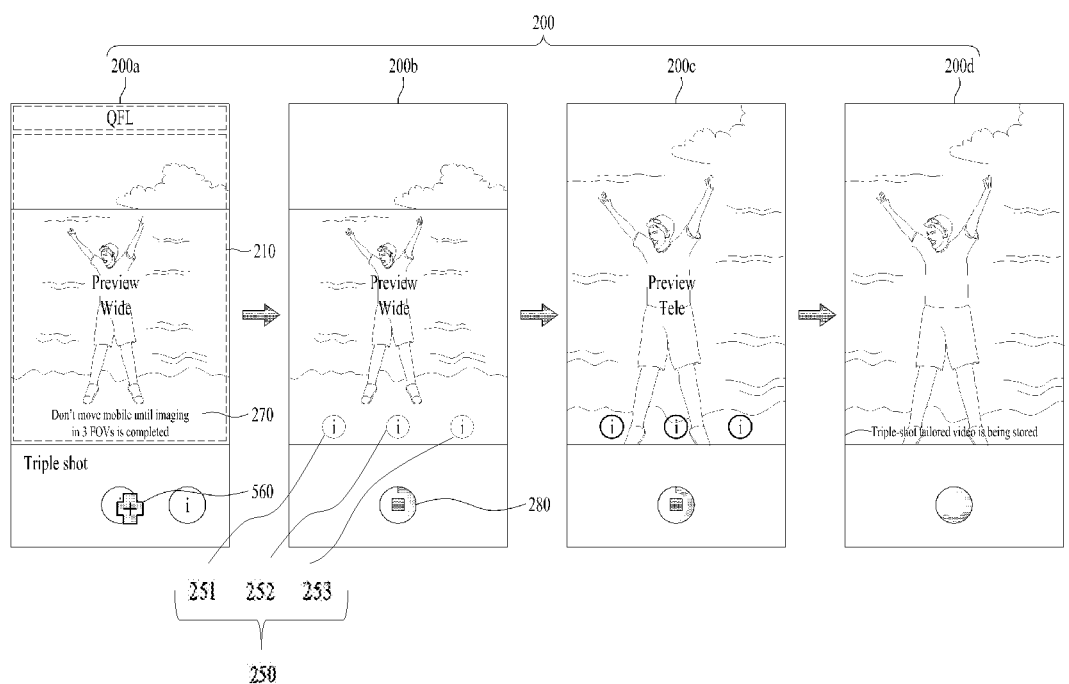

[FIG.10]
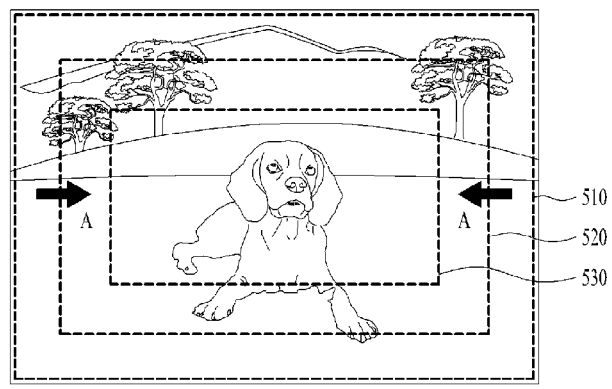
(a)
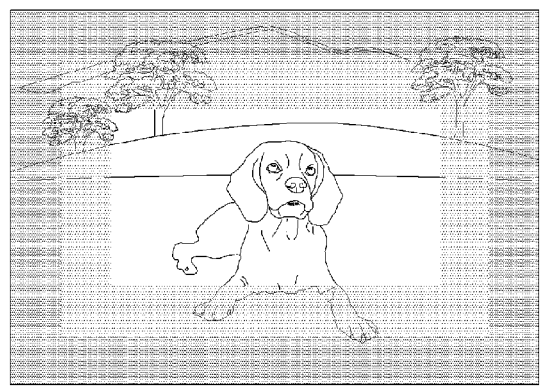
(b)

[FIG.11]
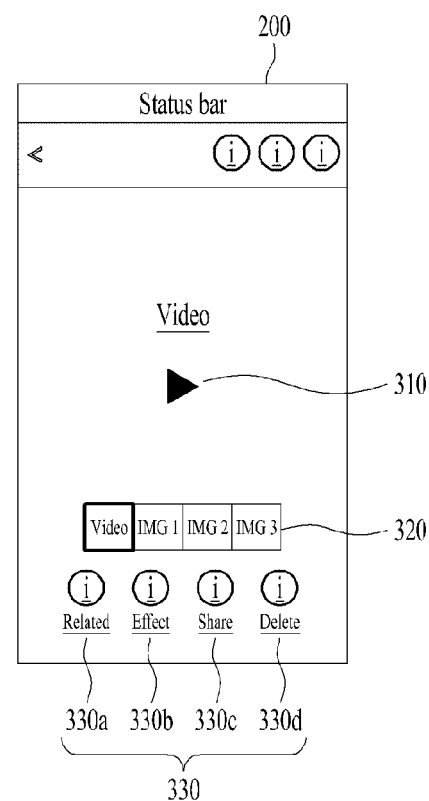

[FIG. 12]
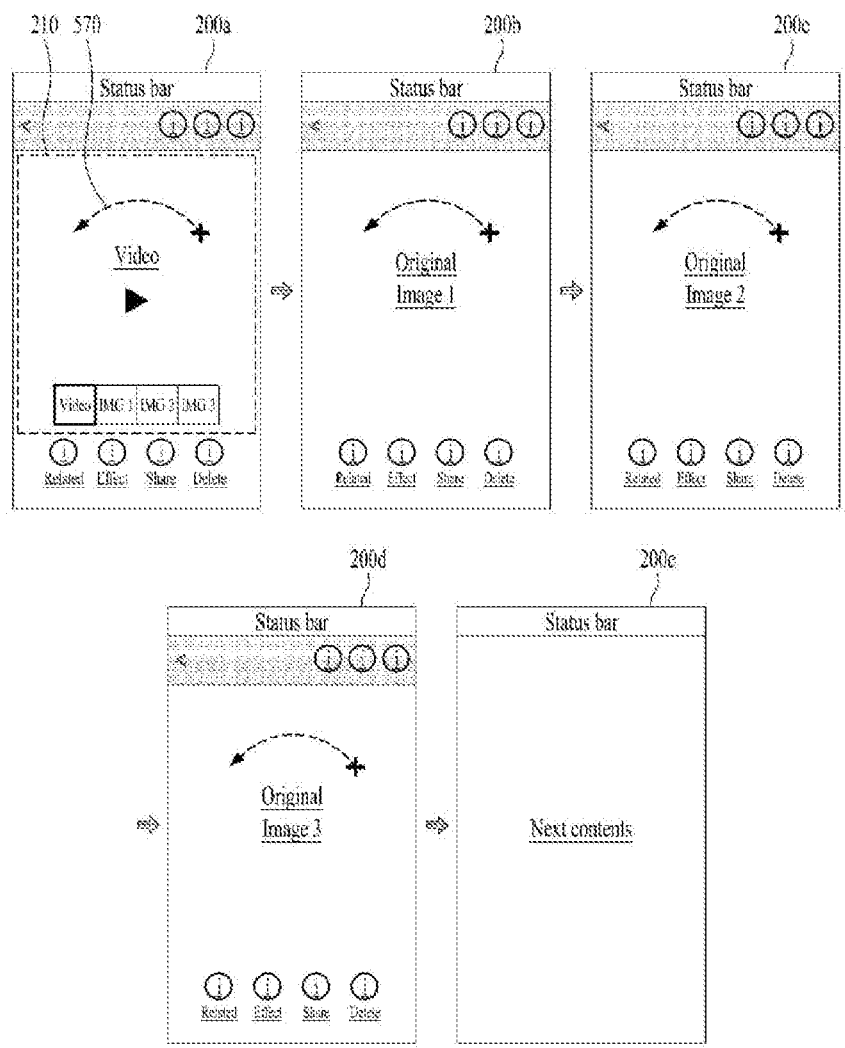

[FIG. 13]
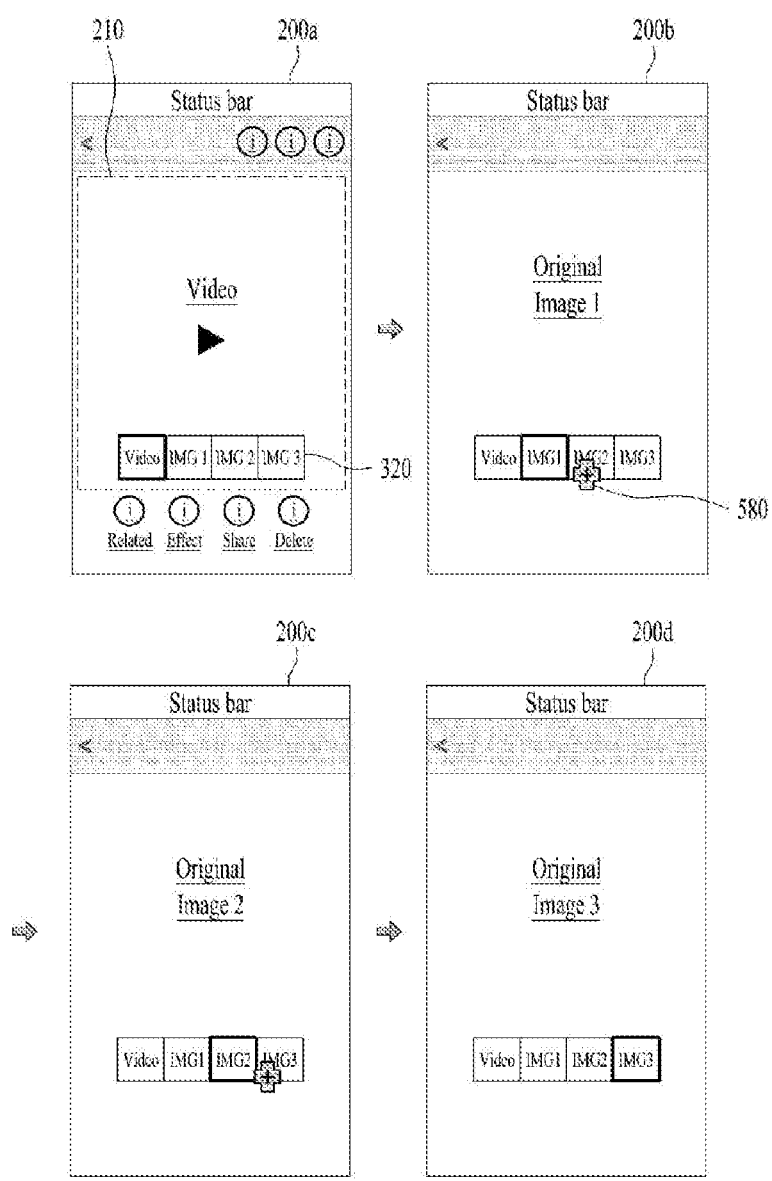

[FIG.14]
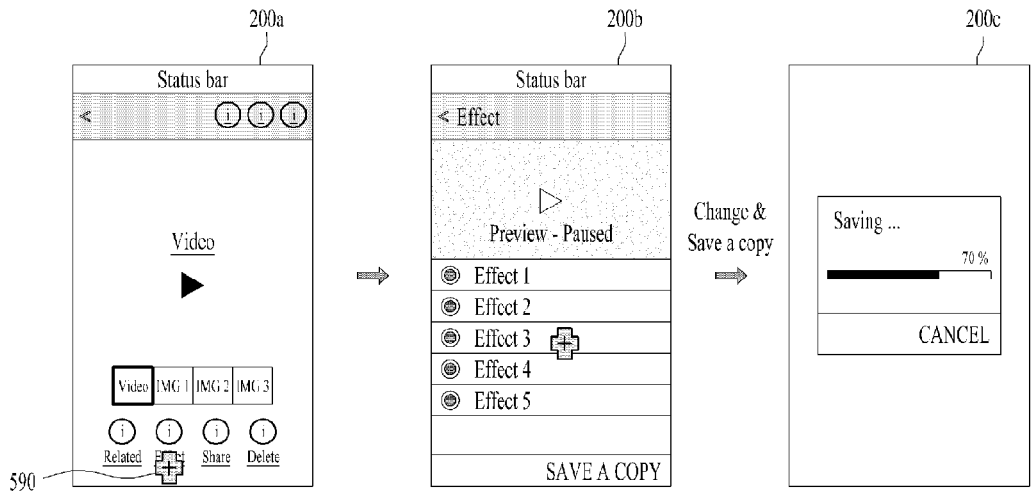

[FIG. 15]
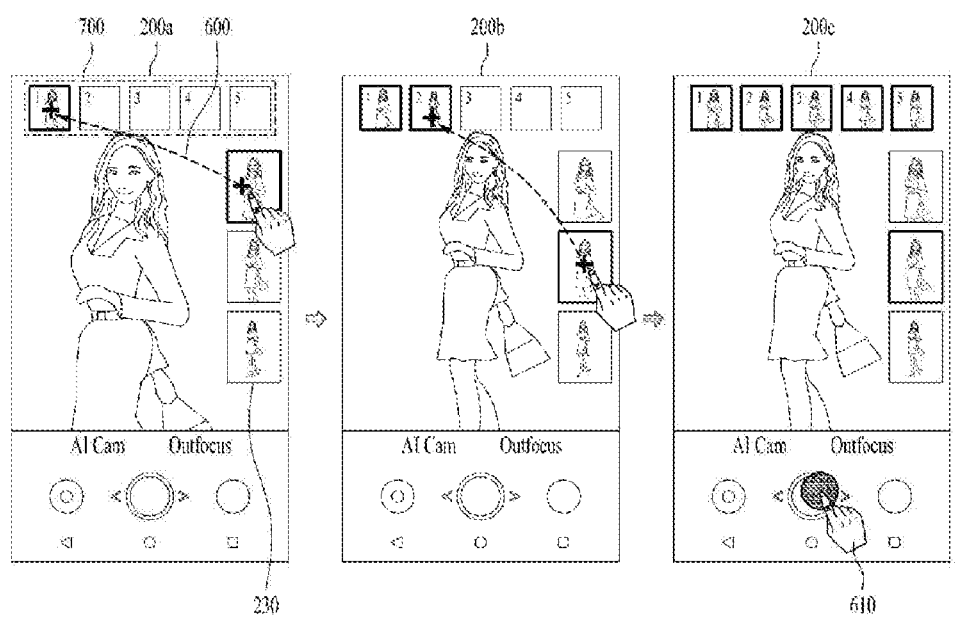

MOBILE TERMINAL

CROSS-REFERENCE TO RELATED APPLICATIONS

Pursuant to 35 U.S.C. § 119(a), this application claims the benefit of an earlier filing date and right of priority to International Application No. PCT/KR2018/011338 filed on Sep. 21, 2018, the contents of which are hereby incorporated by reference herein in its entirety.

BACKGROUND

1. Field

The present disclosure relates to a mobile terminal. More particularly, the present disclosure may be applied to a technical field in which a mobile terminal including triple cameras having different FOVs (Field Of Views) captures three images using a single imaged signal and shortens a capturing time.

2. Description of Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

One of the most important functions of the multimedia device is an imaging function. Accordingly, a mobile terminal is equipped with a plurality of cameras that provide a plurality of FOVs (Field of Views) respectively.

Recently, the mobile terminal is equipped with a number of cameras that are larger than the number of ISPs (Image Signal Processors). In this case, it may not be possible to capture an image at a time using the plurality of cameras.

Further, there is a problem that it takes longer time to capture an image even by changing an activated camera among the plurality of camera. Thus, it is necessary to solve this problem.

SUMMARY

The present disclosure aims to provide a mobile terminal including triple cameras having different FOVs (Field Of Views) capturing three images using a single imaged signal and shortening a capturing time.

In one aspect of the present disclosure, there is proposed a mobile terminal including triple cameras having first, second and third FOVs (field of views) respectively, wherein the first FOV is larger than the second FOV which is larger than the third FOV, wherein the mobile terminal includes: a display for outputting visual information; and a controller configured for controlling the triple cameras and the display, wherein the controller is configured for: detecting a signal to indicate capturing an object by the triple cameras at a time; in response to the detected signal, activating cameras of the first FOV and second FOV to capture the object individually; deactivating one of the cameras of the first FOV and second FOV, wherein one of the cameras of the first FOV and second FOV has captured the object earlier than the other thereof; and activating a camera of the third FOV to capture the object using an imaging setting values obtained from at least one of the cameras of the first FOV and second FOV.

In one embodiment, the mobile terminal further includes a buffer to temporarily store the imaging setting value.

In one embodiment, the controller is further configured for: when the camera of the third FOV is activated, transferring the imaging setting value stored in the buffer to the camera of the third FOV such that the imaging setting value is set to an initial imaging setting value of the camera of the third FOV.

In one embodiment, the imaging setting value includes at least one of AE (auto exposure value), AF (auto focus value), and a white balance.

In one embodiment, when the controller detects the signal to indicate capturing the object by the triple cameras at a time, the controller is configured for detecting the signal to indicate capturing the object by the triple cameras at a time in response to a user pressing an imaging button once.

In one embodiment, the controller is further configured for applying each preset imaging effect to each of the triple cameras to capture the object at the same time.

In one embodiment, the controller is further configured for processing the three images of the object captured from the triple cameras in a preset order to generate single video data.

In one embodiment, the controller is further configured for applying a pre-set effect to between the three images of the object captured from the triple cameras to generate the single video data.

In one embodiment, the preset effect includes at least one of blur, warp, and zoom effects.

In one embodiment, the mobile terminal further include a memory to store the generated video data, wherein the controller is further configured for adding the three image files acquired from the triple cameras to an end portion of a file corresponding to the generated video data and storing the file in the memory.

In one embodiment, the controller is further configured for adding XMP (Extensible Metadata Platform) meta data to a beginning portion of a file corresponding to the generated video data and storing the file in the memory, wherein the meta data indicates a location of each of the three image files obtained from the triple cameras.

In one embodiment, the controller is further configured for: when the generated video data is re-edited, detecting the three image files acquired from the triple cameras using the XMP meta data; and generating re-edited video data using the detected three image files.

In one embodiment, the controller is further configured for adding the three image files to an end portion of a file corresponding to the re-edited video data and storing the file in the memory.

In one embodiment, the controller is further configured for adding XMP (Extensible Metadata Platform) meta data to a beginning portion of a file corresponding to the re-edited video data and storing the file in the memory, wherein the meta data indicates a location of each of the detected three image files.

In one embodiment, the controller is further configured for changing at least one of an effect, a connection order, and a repeating frequency applied to between the three detected images to re-edit the generated vide data.

Effects of the present disclosure are as follows but are not limited thereto.

According to at least one of the embodiments of the present disclosure, one imaged signal may be used to obtain images captured by the triple cameras respectively.

According to at least one of the embodiments of the present disclosure, a time spent in capturing an image by each of the triple cameras may be shortened.

According to at least one of the embodiments of the present disclosure, the image captured by each of the triple cameras may be processed to generate a video, which may be conveniently re-edited.

In addition to the effects as described above, specific effects of the present disclosure are described together with specific details for carrying out the invention.

BRIEF DESCRIPTION OF THE DRAWINGS

FIG. 1A is a block diagram illustrating a mobile terminal according to the present disclosure.

FIG. 1B and FIG. 1C are conceptual diagrams of one example of a mobile terminal according to the present disclosure when viewed in different directions.

FIG. 2 and FIG. 3 are diagrams illustrating an embodiment for displaying multi-previews of a plurality of cameras in accordance with the present disclosure.

FIG. 4 is an illustration of an implementation table of cameras activated to generate multi-previews according to the present disclosure.

FIG. 5 and FIG. 6 are diagrams illustrating an embodiment of a preview of an off camera generated by cropping a preview sensed in an open camera and a preview sensed in an open camera according to the present invention.

FIG. 7 to FIG. 9 are diagrams showing an embodiment of capturing a photo at a time with a triple camera according to the present invention.

FIG. 10 is a diagram illustrating an embodiment of generating an image by applying a blur effect between images captured by a triple camera according to the present invention.

FIG. 11 to FIG. 13 are views illustrating an embodiment of outputting the captured image in response to an image generated through an image captured by a triple camera according to the present invention.

FIG. 14 is a diagram illustrating an embodiment of re-editing an image generated through an image captured by a triple camera according to the present invention.

FIG. 15 is a diagram illustrating an embodiment of capturing an image and generating an image by using a triple camera according to the present invention.

DETAILED DESCRIPTIONS

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims. In general, a suffix such as "module" and "unit" may be used to refer to elements or components. Use of such a suffix herein is merely intended to facilitate description of the specification, and the suffix itself is not intended to give any special meaning or function. The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an A/V input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

As one example, the controller 180 controls some or all of the components illustrated in FIGS. 1A-1C according to the execution of an application program that have been stored in the memory 170.

FIGS. 1B and 1C are conceptual views of one example of the mobile terminal, viewed from different directions;

The mobile terminal includes a display unit 151, a first and a second audio output modules 152*a*/152*b*, a proximity sensor 141, an illumination sensor 142, an optical output module, a first and a second cameras 121*a*/121*b*, a first and a second manipulation units 123*a*/123*b*, a microphone 122, interface unit 160 and the like.

It will be described for the mobile terminal as shown in FIGS. 1B and 1C. The display unit 151, the first audio output module 152*a*, the proximity sensor 141, an illumination sensor 142, the optical output module, the first camera 121*a* and the first manipulation unit 123*a* are arranged in front surface of the terminal body, the second manipulation unit 123*b*, the microphone 122 and interface unit 160 are arranged in side surface of the terminal body, and the second audio output modules 152*b* and the second camera 121*b* are arranged in rear surface of the terminal body.

However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

FIG. 2 and FIG. 3 are diagrams illustrating an embodiment for displaying multi-previews 230 of a plurality of cameras in accordance with the present disclosure.

One of the most important functions of the multimedia device is an imaging function. Accordingly, a mobile terminal is equipped with a plurality of cameras that provide a plurality of FOVs (Field of Views) respectively.

A plurality of cameras may be included on one face of the mobile terminal to capture an image of the same object according to different FOVs.

FIG. 1C shows an embodiment including one second camera 121b on the back of the mobile terminal, but a plurality of second cameras 121b may be provided with different FOV FOVs.

Recently, a mobile terminal is equipped with a number of cameras that are larger than the number of ISPs (Image Signal Processors). In this case, it is impossible to capture an image at a time using the plurality of cameras.

The plurality of cameras may include a wide angle camera, a normal angle camera, a tele-photo camera. However, in some cases, a camera with a different FOV may be further included.

In order to simultaneously output the previews sensed by the plurality of cameras onto a display 200 of the mobile terminal, the number of ISPs corresponding to the number of cameras of the plurality should be included.

For example, in order to simultaneously output the previews sensed using a wide angle camera, a normal angle camera, and a tele-photo camera onto the display 200 of the mobile terminal, three ISPs should be required.

However, it is not desirable that the number of ISPs is adjusted to the number of cameras, because the increase in the number of ISPs increases a cost, increases the size of the mobile terminal, increases the power consumption thereof, and degrades a processing speed.

Therefore, the present disclosure aims to provide a method for simultaneously outputting previews corresponding to at least two cameras using two ISPs.

To this end, a mobile terminal including a plurality of cameras having different FOVs according to the present disclosure may include a display 200 that outputs a preview as sensed by an activated camera among the plurality of cameras, and a controller that controls the plurality of cameras and the display 200.

The controller may include two ISPs (image signal processors).

The controller controls the display to output the multi-previews 230 of the plurality of cameras in response to a first signal outputting the multi-previews 230 of the plurality of cameras. When the camera of the FOV smaller than the FOV of the activated camera among the plurality of cameras is deactivated, the controller may crop a preview that is sensed by the deactivated camera to generate a preview of the activated camera.

Specifically, referring to FIGS. 2 and 3, the mobile terminal outputs a preview sensed by a currently activated camera in a first region 210 of the display 200 and output multi-previews 230 corresponding to the plurality of cameras included in the mobile terminal into a second region 220 of the display 200.

FIG. 2 and FIG. 3 illustrate an embodiment in which the plurality of cameras of different FOVs include the wide angle, normal angle, and tele-photo camera. However, the number of cameras is not limited to three.

The multi-previews 230 may include a preview 231 corresponding to the FOV of the wide angle camera, a preview 232 corresponding to the FOV of the normal angle camera, and a preview 233 corresponding to the FOV of the tele-photo camera.

Since the mobile terminal according to the present disclosure includes two ISPs, the mobile terminal may not simultaneously detect the previews of three or more cameras.

Accordingly, the mobile terminal according to the present disclosure may crop the preview as sensed by the activated camera, and generate a preview of the deactivated camera using the cropped preview when the FOV of the deactivated camera is smaller than the FOV of the activated camera, thereby to reduce the number of necessary ISPs.

However, if the FOV of the deactivated camera is larger than the FOV of the activated camera, it is not possible to generate the preview of the deactivated camera by cropping a preview sensed by the activated camera.

Therefore, the mobile terminal according to the present disclosure may solve the problem by including an ISP for sensing the preview of the activated camera and a separate ISP.

Specifically, the controller of the mobile terminal according to the present disclosure may be configured to, when the camera of the FOV larger than the FOV of the activated camera among the plurality of cameras is deactivated, further activate a camera of the largest FOV among the plurality of cameras to preview a preview thereof.

The camera of the largest FOV that is further activated may sense the preview using a separate ISP.

When the controller further activates the camera of the largest FOV among the plurality of cameras, the controller may crop a preview sensed by at least one of the two activated cameras and generate a preview of the deactivated camera using the cropped preview.

Hereinafter, an example of a process of further activating a camera in response to a camera being deactivated when receiving the first signal and a process of cropping a sensed preview is illustrated.

FIG. 4 is an implementation table 400 of cameras activated to generate multi-previews according to the present disclosure.

Table 4 of FIG. 4 shows the plurality of cameras having different FOVs in a first region 410. The cameras activated to output the multi-previews 230 of the plurality of cameras (see FIG. 2) are indicated in a second region 420 and a third region 430.

The table 400 of FIG. 4 shows an embodiment in which the plurality of cameras include a wide angle camera, a normal angle camera, and a tele-photo camera. However, a process illustrated below may be equally applied to a case where there are at least four cameras.

Referring to the table 400 of FIG. 4, when the first signal for outputting the multi-previews 230 (see FIG. 2) is detected (before outputting the multi-previews), a camera activated to output a preview in a first region 210 (see FIG. 2) may be a wide angle camera. In this case, the controller does not need to further activate the normal angle camera and tele-photo camera. Alternatively, when the first signal for outputting the multi-previews 230 (see FIG. 2) is detected (before outputting the multi-previews), a camera activated to output a preview in a first region 210 (see FIG. 2) may be a normal angle camera. In this case, the controller should further activate the wide angle camera. Alternatively, when the first signal for outputting the multi-previews 230 (see FIG. 2) is detected (before outputting the multi-previews), a camera activated to output a preview in a first region 210 (see FIG. 2) may be a tele-photo a camera. In this case, the controller should further activate the wide angle camera.

Accordingly, in order than the mobile terminal including a normal angle camera, a tele-photo camera, and a wide angle camera uses the two ISPs to generate the multi-previews 230, the mobile terminal may activate only the wide angle camera, activate both of the wide angle camera and normal angle camera, or activate both of the wide angle camera and tele-photo camera.

Specifically, a method for generating the multi-previews 230 will be described in each of a case when activating only the wide angle camera, a case when activating both of the wide angle camera and normal angle camera, and a case when activating both of the wide angle camera and tele-photo camera.

If the camera activated to output the preview to the first region 210 at the time of detecting the first signal is a wide angle camera, the previews of the remaining deactivated cameras may be generated by cropping the preview sensed by the wide angle camera in a corresponding manner to the FOVs of the remaining deactivated cameras.

Further, if the camera activated to output the preview to the first region 210 at the time of detecting the first signal is a normal angle camera, the preview of the deactivated tele-photo camera may be generated by cropping the preview sensed by the normal angle camera in a corresponding manner to the FOV of the tele-photo camera. In this connection, the normal angle camera may sense the preview thereof using a first ISP while the wide angle camera may sense the preview thereof using a second ISP.

Further, if the camera activated to output the preview to the first region 210 at the time of detecting the first signal is a tele-photo camera, the wide angle camera senses the preview thereof using the second ISP. The preview of the deactivated normal angle camera may be generated by cropping the preview sensed by the wide angle camera which is further activated.

That is, when the mobile terminal according to the present disclosure detects the first signal, the camera activated to output a preview in the first region 210 is the camera having the largest FOV. In this case, the controller may use only the first ISP to generate the previews of the remaining deactivated cameras. Alternatively, when the mobile terminal according to the present disclosure detects the first signal, the camera activated to output a preview in the first region 210 is not the camera having the largest FOV. In this case, the controller may further activate the camera of the largest FOV to preview the remaining one ISP, and thus the camera of the largest FOV may sense the preview thereof using the second ISP. Then, the preview of the remaining deactivated camera may be generated by cropping the previews that are sensed by the two activated cameras.

Using the same process, the mobile terminal according to the present disclosure can simultaneously output the previews of three or more cameras using only two ISPs.

FIG. 5 shows comparison between FOVs of the wide angle camera, normal angle camera and tele-photo camera. FIG. 6 shows previews of the wide angle camera, a normal angle camera, and a tele-photo camera.

The wide angle camera, normal angle camera and tele-photo camera may generate corresponding previews by sensing the same object at different FOVs in the same direction.

The first FOV 510 of the wide angle camera is the largest. The second FOV 520 of the normal angle camera is contained in the first FOV 510 of the wide angle camera. The third FOV 530 of the tele-photo camera is contained in the second FOV 520 of the normal angle camera.

Therefore, when sensing the preview using the wide angle camera, the controller may generate the previews of the deactivated normal angle camera and tele-photo camera by cropping the preview of the wide angle camera.

Specifically, FIG. 6(a) shows the preview corresponding to the wide angle camera. FIG. 6(b) shows the preview corresponding to the normal angle camera. FIG. 6(c) shows the preview corresponding to the tele-photo camera.

The previews corresponding to the cameras have the same size. Thus, when generating the preview of the deactivated camera, the controller may crop the preview sensed by the currently activated camera and expand the cropped preview to be adapted to a size of the preview that the currently deactivated camera senses when being previously activated.

Therefore, when the cropped preview is expanded, the expanded preview may have a deteriorated quality.

However, the multi-previews 230 (FIG. 2) may act as a plurality of live thumbnails outputted in a corresponding manner to the FOVs of the plurality of cameras which may provide intuitive FOVs comparison to the user. Thus, the image quality of the multi-previews 230 may not be an important factor. In other words, when the cropped preview is expanded, the expanded preview may have a deteriorated quality. However, this may not be problematic. Further, as described with reference to FIG. 2, each of the multi-previews 230 may be display in each second region 220 (FIG. 2), which is smaller than the first region 210 (FIG. 2) that outputs the main preview, the deteriorated quality of the expanded preview does not matter.

FIG. 7 to FIG. 9 illustrate an embodiment in which an image is captured at once using triple cameras according to the present disclosure.

One of the most important functions of the multimedia device is an imaging function. Accordingly, a mobile terminal is equipped with a plurality of cameras that provide a plurality of FOVs (Field of Views) respectively.

Recently, the mobile terminal is equipped with a number of cameras that are larger than the number of ISPs (Image Signal Processors). In this case, it may not be possible to capture an image at a time using the plurality of cameras.

Further, there is a problem that it takes longer time to capture an image even by changing an activated camera among the plurality of camera. Thus, it is necessary to solve this problem.

Accordingly, the present disclosure provides a mobile terminal having a processor to use only two ISPs to capture a picture at once by the triple cameras with different FOVs, thereby to shorten the capturing time.

To this end, the present disclosure provides a mobile terminal including triple cameras having first, second and third FOVs (field of views) respectively, wherein the first FOV is larger than the second FOV which is larger than the third FOV, wherein the mobile terminal includes: a display 200 for outputting visual information; and a controller configured for controlling the triple cameras and the display, wherein the controller is configured for: detecting a signal to indicate capturing an object by the triple cameras at a time; in response to the detected signal, activating cameras of the first FOV and second FOV to capture the object individually; deactivating one of the cameras of the first FOV and second FOV, wherein one of the cameras of the first FOV and second FOV has captured the object earlier than the other thereof; and activating a camera of the third FOV to capture the object using an imaging setting values obtained from at least one of the cameras of the first FOV and second FOV.

The controller may include two ISPs.

Further, the triple cameras of the first FOV, second FOV and third FOV may correspond to a wide angle camera, a normal angle camera, and a tele-photo camera, respectively.

Specifically, FIG. 7 shows an embodiment in which the controller captures an image by simultaneously activating a wide angle camera and a normal angle camera, and, then, the wide angle camera which has captured the image earlier than the normal angle camera is deactivated, and, at the same time, the object is captured by activating a tele-photo camera.

Further, FIG. 8 shows an embodiment in which the controller captures an image by simultaneously activating a wide angle camera and a normal angle camera, and, then, the wide angle camera which has captured the image earlier than the normal angle camera is deactivated, and, at the same time, the object is captured by activating a tele-photo camera, where the tele-photo camera captures the object using AE (auto exposure) imaging setting value obtained from the wide angle camera and AF (auto focus) imaging setting value obtained from the normal angle camera, thereby to shorten the time to capture the object using the tele-photo camera and thus to shorten the time to capture the object using the triple cameras.

Specifically, FIG. 8 shows an example of shortening the time for the tele-photo camera to perform the auto focus from 500 ms to 400 ms and thus shortening the total consumption time to 2050 to 2150 ms.

To this end, the mobile terminal of the present disclosure may further include a buffer for temporarily storing the imaging setting value.

Further, in one embodiment, the controller is further configured for: when the camera of the third FOV is activated, transferring the imaging setting value stored in the buffer to the camera of the third FOV such that the imaging setting value is set to an initial imaging setting value of the camera of the third FOV In one embodiment, the imaging setting value includes at least one of AE (auto exposure value), AF (auto focus value), and a white balance.

In one embodiment, the controller is further configured for applying each preset imaging effect to each of the triple cameras to capture the object at the same time.

The preset imaging effect may include at least one of lateral lighting and focusing.

Specifically, FIG. 9 is a view showing an embodiment of the display 200 in a process of capturing a picture at once with triple cameras according to the present disclosure.

In one embodiment, when the controller detects the signal to indicate capturing the object by the triple cameras at a time, the controller is configured for detecting the signal to indicate capturing the object by the triple cameras at a time in response to a user pressing an imaging button 560 once.

In a first display 200a, a preview corresponding to the wide angle camera is output to the first region 210, a first indicator 270 indicating that the object is captured using the triple cameras at a time is output, a second indicator 270 indicative of a notice when imaging the object using the triple cameras at a time is output. The mobile terminal may start the processor to acquire an image at a time using the triple cameras in response to the user pushing the imaging button 560 once.

A second display 200b displays a third indicator indicating a degree of the imaging process progress.

A third display 200c corresponds to a case when imaging is started using a tele-photo camera. In the third display, the preview of the tele-photo camera may be output in the first region.

Further, in one embodiment, the controller is further configured for processing the three images of the object captured from the triple cameras in a preset order to generate single video data. A fourth display 200d may correspond to this process.

Specifically, after capturing the image using the triple cameras ends, a fourth indicator 290 indicating that the video data is being generated may be output in the fourth display 200d during the image processing.

Hereinafter, a processor for generating and displaying one image by processing three images acquired in the triple cameras in a predetermined order will be described.

FIG. 10 shows an example of generating video data by applying a blur effect to between images captured by triple cameras according to the present disclosure.

Specifically, FIG. 10(a) compares FOVs of the wide angle camera, normal angle camera, and tele-photo camera.

The wide angle camera, normal angle camera and tele-photo camera may generate corresponding previews by sensing the same object at different FOVs in the same direction.

The first FOV 510 of the wide angle camera is the largest. The second FOV 520 of the normal angle camera is contained in the first FOV 510 of the wide angle camera. The third FOV 530 of the tele-photo camera is contained in the second FOV 520 of the normal angle camera.

In one embodiment, the controller is further configured for applying a pre-set effect to between the three images of the object captured from the triple cameras to generate the single video data.

In one embodiment, the preset effect includes at least one of blur, warp, and zoom effects Specifically, FIG. 10(b) shows an embodiment in which an image captured by a wide angle camera is zoomed-in toward an image captured by a tele-photo camera based on the direction A in FIG. 10(a), and the three images are connected to each other using a blur effect.

In one embodiment, the mobile terminal further include a memory to store the generated video data, wherein the controller is further configured for adding the three image files acquired from the triple cameras to an end portion of a file corresponding to the generated video data and storing the file in the memory. This will be described below.

FIG. 11 to FIG. 13 illustrate an embodiment of outputting the captured image in response to the video data being generated using an image captured with the triple cameras according to the present disclosure.

The controller of the mobile terminal according to the present disclosure may control the display 200 to display three images corresponding to the generated video data when re-editing the generated video data.

Specifically, FIG. 11 may be a screen configuration of the display 200 corresponding to a step before playing the video data generated using the images captured at once with triple cameras.

The display 200 may output a thumbnail 300 together with a play button 310 of the generated video data. The thumbnail 300 may include a thumbnail 320a of the generated video data and thumbnails 320b, 320c, and 320d of three images captured at once by the triple cameras.

Further, the display 200 may output an icon 330 associated with the generated video data.

The icon 330 related to the generated video data includes at least one of a first icon 330a that may display information related to the generated video data, a second icon 330b that may change the effect applied to the generated video data, a third icon 330c that may share the generated video data, and a fourth icon 330d which may delete the generated video data. However, an icon 330 that performs other functions may be included in some cases.

Specifically, FIG. 12 shows an embodiment of outputting a captured image on the display 200 in response to the video data being generated.

A first display 200a shows an embodiment of outputting a thumbnail of video data generated in the first region 210. This may correspond to the screen configuration of the display 200 in FIG. 16.

A second display 200b shows an example of outputting a first image among the three images corresponding to the generated video data in the first region 210 in response to a drag-touch input 570 to the first display 200a via which a current page moves to a next page.

A third display 200c shows an example of outputting a second image among the three images corresponding to the generated video data in the first region 210 in response to a drag-touch input 570 to the second display 200b via which a current page moves to a next page.

A fourth display 200d shows an example of outputting a third image among the three images corresponding to the generated video data in the first region 210 in response to a drag-touch input 570 to the third display 200c via which a current page moves to a next page.

A fifth display 200e shows an example of outputting next content in response to a drag-touch input 570 to the fourth display 200d via which a current page moves to a next page. The next content may be different from the video data corresponding to the first to fourth displays 200a to 200d and may be content related to another video data generated using images captured with the triple cameras, or content related to video data generated by re-editing the video data corresponding to the first to fourth displays 200a to 200d.

The third image of the three images corresponding to the generated video data may be output.

Specifically, FIG. 13 shows another embodiment of outputting a captured image on the display 200 in response to the video data being generated.

A first display 200a shows an embodiment of outputting a thumbnail of video data generated in the first region 210. This may correspond to the screen configuration of the display 200 in FIG. 16.

A second display 200b shows an embodiment of outputting a first image among the three images corresponding to the generated video data in the first region 210 in response to the selection 580 of the thumbnail of the first image among the thumbnails 320 on the first display 200a.

A third display 200c shows an embodiment of outputting a second image among the three images corresponding to the generated video data in the first region 210 in response to the selection 580 of the thumbnail of the second image among the thumbnails 320 on the second display 200b.

A fourth display 200d shows an embodiment of outputting a third image among the three images corresponding to the generated video data in the first region 210 in response to the selection 580 of the thumbnail of the third image among the thumbnails 320 on the fourth display 200c.

In one embodiment, the controller is further configured for changing at least one of an effect, a connection order, and a repeating frequency applied to between the three detected images to re-edit the generated vide data.

In one embodiment, the controller is further configured for adding XMP (Extensible Metadata Platform) meta data to a beginning portion of a file corresponding to the generated video data and storing the file in the memory, wherein the meta data indicates a location of each of the three image files obtained from the triple cameras.

In one embodiment, the controller is further configured for: when the generated video data is re-edited, detecting the three image files acquired from the triple cameras using the XMP meta data; and generating re-edited video data using the detected three image files.

In one embodiment, the controller is further configured for adding the three image files to an end portion of a file corresponding to the re-edited video data and storing the file in the memory.

In one embodiment, the controller is further configured for adding XMP (Extensible Metadata Platform) meta data to a beginning portion of a file corresponding to the re-edited video data and storing the file in the memory, wherein the meta data indicates a location of each of the detected three image files.

In one embodiment, the controller is further configured for changing at least one of an effect, a connection order, and a repeating frequency applied to between the three detected images to re-edit the generated vide data.

FIG. 14 is a diagram showing an embodiment for re-editing video data generated using the images captured by the triple cameras according to the present disclosure.

A first display 200a may correspond to the screen configuration of the display 200 shown in FIG. 11.

A second display 200b is an example of displaying an effect varying upon selecting 590 a second icon 330b which may change the effect applied to the generated video data in the first display 200a.

A third display 200c is an embodiment showing that the video data is re-processed using an effect different from an effect applied to the generated video data upon selecting 570 the different effect on the second display 200b.

FIG. 15 shows an example of generating video data with triple cameras using multi-previews 230 according to the present disclosure.

The multi-previews 230 may be generated and output as described above with reference to FIG. 2.

A first display 200a shows an example in which the user drags 600 one among the multi previews 230 to a first position of an order setting window 700 such the dragged multi-preview is displayed in the first position.

A second display 200a shows an example in which the user drags 600 one among the multi previews 230 to a second position of an order setting window 700 such the dragged multi-preview is displayed in the second position.

The third display 200c shows an example in which an order at which the images captured from the triple cameras are connected to each other in the order setting window 700 to generates the video data is configured and then an imaging button 610 is pressed to generate the video data in the configured order.

The detailed examples should not be construed in any way as limiting and should be considered illustrative. The scope of the present disclosure shall be determined by rational interpretation of the appended claims. All changes within an equivalent range of the present disclosure are included in the scope of the present disclosure.

What is claimed is:

1. A mobile terminal comprising:
   first, second, and third cameras having first, second and third field of views (FOVs), respectively, wherein the first FOV is larger than the second FOV which is larger than the third FOV;
   a display configured to output visual information; and
   a controller configured to:
   detect a signal for capturing an image of an object by the first, second, and third cameras at a same time;
   activate the first camera and the second camera in response to the detected signal such that each of the activated first and second cameras individually captures the image of the object;
   deactivate one of the first and second cameras that has captured the image of the object prior to capturing of the image of the object by another one of the first and second cameras;
   activate the third camera such that the activated third camera captures the image of the object using at least one imaging setting value obtained from at least one of the first or second cameras;
   process three images of the object captured from the first, second, and third cameras in a preset time series to generate single video; and
   apply a preset effect between each image among the three images to express zoom effect naturally, wherein the preset effect includes at least one of a blur or warp effect.

2. The mobile terminal of claim 1, further comprising a buffer configured to temporarily store imaging setting values.

3. The mobile terminal of claim 2, wherein the controller is further configured to:
   transfer the imaging setting value stored in the buffer to the third camera when the third camera is activated such that the imaging setting value stored in the buffer is set to an initial imaging setting value of the third camera.

4. The mobile terminal of claim 1, wherein the imaging setting value includes at least one of an auto exposure (AE) value, an auto focus (AF) value, or a white balance.

5. The mobile terminal of claim 1, wherein the controller is further configured to detect the signal in response to a user input comprising pressing an imaging button once.

6. The mobile terminal of claim 1, wherein the controller is further configured to apply each preset imaging effect to a respectively corresponding one of the first, second, and third cameras to capture the image of the object at the same time.

7. The mobile terminal of claim 6, wherein the preset imaging effect includes at least one of lateral lighting or focusing.

8. The mobile terminal of claim 1, further comprising a memory configured to store the generated video,
   wherein the controller is further configured to:
   add three image files acquired from the first, second, and third cameras to an end portion of a file corresponding to the generated video; and
   store the file to which the three image files have been added in the memory.

9. The mobile terminal of claim 8, wherein the controller is further configured to:
   add Extensible Metadata Platform (XMP) meta data to a beginning portion of the file corresponding to the generated video; and
   store the file to which the XMP data is added in the memory,
   wherein the XMP meta data indicates a location of each of the three image files in the stored file to which the three image files and the XMP meta data have been added.

10. The mobile terminal of claim 9, wherein the controller is further configured to:
    detect the three image files using the XMP meta data when the generated video is re-edited; and
    generate re-edited video using the detected three image files.

11. The mobile terminal of claim 10, wherein the controller is further configured to:
    add the three image files to an end portion of a file corresponding to the re-edited video; and
    store the file corresponding to the re-edited video in the memory and to which the three images files have been added.

12. The mobile terminal of claim 11, wherein the controller is further configured to:
    add XMP meta data to a beginning portion of the file corresponding to the re-edited video; and store the file corresponding to the re-edited video and to which the XMP meta data has been added in the memory,
wherein the XMP meta data indicates a location of each of the detected three image files in the stored file corresponding to the re-edited video and to which the three image files and the XMP meta data have been added.

13. The mobile terminal of claim 10, wherein the controller is further configured to change at least one of an effect, a connection order, or a repeating frequency applied to the detected three images to re-edit the generated video.

14. The mobile terminal of claim 1, wherein the first camera is a wide angle camera, the second camera is a normal angle camera, and the third camera is a tele-photo camera.

15. The mobile terminal of claim 14, wherein the at least one image setting value comprises an auto exposure (AE) value obtained from the wide angel camera and an auto focus (AF) value obtained from the normal angle camera.

16. The mobile terminal of claim 1, wherein:
the first, second, and third cameras are located on a same side of the mobile terminal; and
no more than two of the first, second, and third cameras are activated at once.

17. The mobile terminal of claim 1, wherein the controller is further configured to cause the display to:
display a preview corresponding to an activated camera among the first, second, and third cameras on a first region of the display; and
display multiple previews corresponding to the first, second, and third cameras on a second region of the display while the preview is displayed on the first region,
wherein the preview corresponding to the activated camera and displayed on the first region corresponds to one of the multiple previews displayed on the second region.

* * * * *